Figure 1:
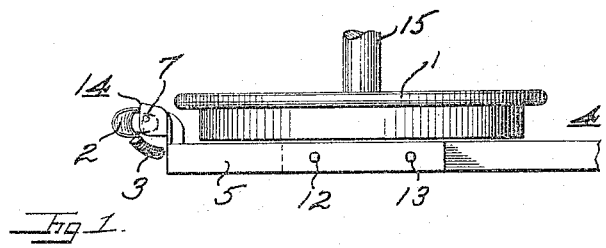

J. H. KUHNS.
WHEEL TREAD FENDER.
APPLICATION FILED SEPT. 30, 1913.

1,156,604.

Patented Oct. 12, 1915.

Witnesses
C. H. Miller Jr.
C. S. Clarke

Inventor
JOHN H. KUHNS

By J. H. Williams
Attorney

COLUMBIA PLANOGRAPH CO., WASHINGTON, D. C.

UNITED STATES PATENT OFFICE.

JOHN HENRY KUHNS, OF GERMANTOWN, OHIO.

WHEEL-TREAD FENDER.

1,156,604.  Specification of Letters Patent.  Patented Oct. 12, 1915.

Application filed September 30, 1913. Serial No. 792,581.

*To all whom it may concern:*

Be it known that I, JOHN HENRY KUHNS, a citizen of the United States, residing at Germantown, in the county of Montgomery and State of Ohio, have invented certain new and useful Improvements in Wheel-Tread Fenders, of which the following is a specification.

This invention relates to an improvement in wheel tread fenders and is designed especially for use in mines where obstructions, such as coal, ore, boulders and the like, may offer hindrance to the rolling of the car wheels over the rails of the track. In such cases great difficulty has been encountered in clearing said obstructions by the impact of the car therewith.

One of the objects of my invention is to provide a simple, efficient, and inexpensive wheel tread fender designed, when coming in contact with an obstruction, or impediment lying on the rail of a track, to thrust or impel said obstruction laterally of the track so as to place it on the roadbed beyond the rails of the track.

With the above and other objects in view my invention consists in the combination, arrangement, and details of construction disclosed in the drawings and specification and then more particularly pointed out in the appended claims.

Figure 2:
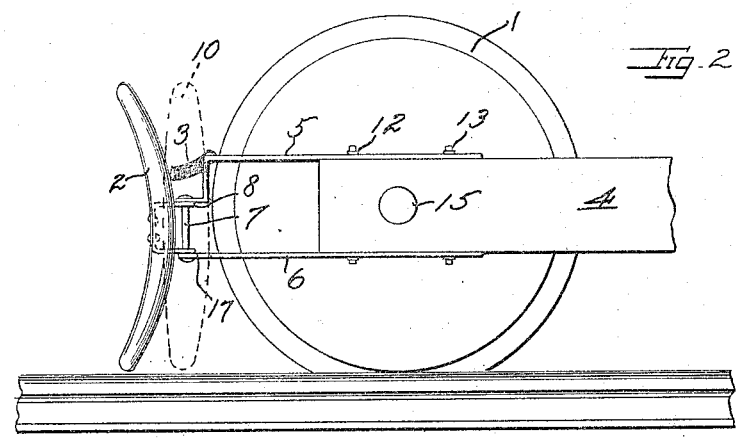
Figure 3:
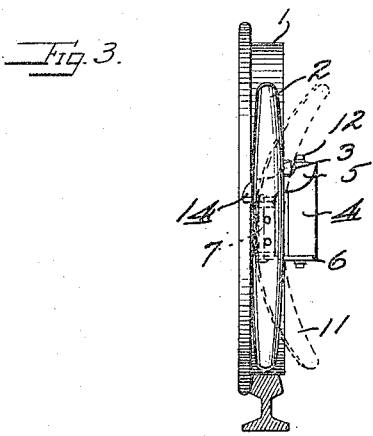
Figure 4:
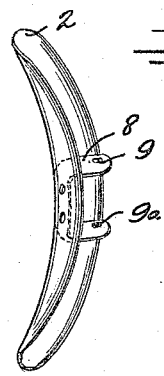

In the drawings, wherein similar reference characters designate similar parts throughout the respective views, Figure 1 is a top plan view of my invention showing the fender attached to truck frame of car, in forward position of car wheel. Fig. 2 is a side elevation view showing fender in forward position of car wheel, and in dotted lines turned laterally. Fig. 3, is a front elevation showing fender in forward position and in dotted lines turned laterally. Fig. 4 is a perspective view of fender detached from car truck.

Referring to the drawings by numerals, car wheel 1 supports frame 4 by axle 15. The fender 2 is substantially U shaped in cross section, presenting a concave face disposed forwardly in front of wheel 1. Firmly attached to the inside of, and at the back of fender 2 is the U shaped member 8, preferably near the longitudinal center of fender 2 and at its latitudinal center. Near either end of U shaped member 8 are holes 9 and 9ª, shown in Fig. 4, said holes are set inward of the latitudinal center of the ends of said U shaped member 8.

Attached to frame 4, by bolts 12 and 13, are arms 5 and 6, extending forwardly and parallel to the outer side of wheel 1. Forward of and opposite to the periphery of wheel 1, arm 5 is turned downward, and then inwardly across the face of wheel 1, with the terminal end of said arm then turned forwardly directly in front of the face of wheel 1. Arm 6 extends forwardly parallel to wheel 1, and its forward terminal end is bent inwardly, then forwardly its forward terminal end being in a vertical line with arm 5.

Near the forward terminal ends of arms 5 and 6 are vertical registering holes. The U shaped member 8 is designed to fit between the forward terminal ends of arms 5 and 6. Fender 2 is held in vertical pivoted position by bolt 7 passing through the registering holes in the forward terminal ends of arms 5 and 6, and holes 9 and 9ª of member 8. Fender 2 is held in forward position by coil spring 3, and is prevented from turning inwardly laterally by the inner edge of the fender 2 coming in contact with the forward terminal end of arm 5 at 14. Holes 9 and 9ª, of member 8, being eccentric inwardly of the longitudinal center of fender 2, a weight or object coming in contact with fender 2 and equally distributed on either side of the longitudinal center of fender 2, if said weight is sufficiently heavy to overcome the pressure of coil spring 3, fender 2 will turn outwardly projecting the object laterally of the track. Fender 2 is shown turned outwardly in Figs. 2 and 3, in dotted lines reference numerals 10 and 11 respectively. In addition to holding fender 2 in a forward position spring 3 acts as a buffer lessening the shock to both the car and object coming in contact with the fender 2.

While I have shown and described the details of construction as now best known to me, I do not intend to limit myself to the exact details of construction save as pointed out in the appended claims.

What I claim and desire to secure by Letters Patent is:—

1. A car fender comprising a frame, a wheel mounted laterally of said frame, bracket arms disposed in vertical spaced-apart relation in advance of and in alinement with said wheel, a vertical pivot mounted in said bracket arms, a guard secured to said pivot, and means for preventing said guard moving toward said wheel.

2. A device of the character described comprising a frame, a wheel disposed laterally of said frame, a vertically-disposed fender mounted in advance of and in alinement with said wheel, means whereby said fender is held against movement toward said wheel, and means whereby said fender may rock in the direction of said frame.

3. A device of the character described comprising a frame, a wheel disposed laterally of said frame, brackets secured to said frame and having portions deflected over in advance of said wheel, a vertical pivot mounted in said brackets, a guard secured upon said brackets, said guard at one edge contacting said brackets and being tiltable around one edge thereof toward said frame, and means for yieldably opposing the movement of said guard.

4. In combination a frame, a wheel disposed laterally of said frame, a flange on the inner side of said wheel, a vertically-disposed guard disposed in alinement with said wheel laterally of said flange, means for movably supporting said guard, means for holding said guard against movement toward said flange, and means whereby said guard may move parallel to said flange.

5. A device of the character described comprising a wheel, a flange on said wheel, a side frame adjacent said wheel, a guard, means carried by said side frame for holding said guard substantially in alinement with said wheel, means for preventing the movement of said guard in the direction of the said flange, and means whereby said guard may rock toward said side frame.

6. A car fender comprising a support, a wheel mounted laterally of said support, a U-shaped guard disposed vertically in advance of and in alinement with said wheel, spaced-apart outwardly-extending lugs carried by said guard, fixed spaced-apart lugs with which said first named lugs are in alinement, a pivot passing through all of said lugs, said guard having one of its edges arranged to contact with one of said fixed lugs and its other edge disposed laterally thereof whereby said guard may tilt around one edge of said fixed lugs, and means for automatically restoring said guard to normal position.

7. A device of the kind described comprising a wheel, a frame disposed laterally of said wheel, two arms projecting in advance of said frame in spaced-apart vertical relation, horizontally-extending vertically spaced-apart lugs carried by said arms, said lugs being disposed in alinement with said wheel, a U-shaped concavo-convex guard having its convex surface disposed toward said lugs, horizontally spaced-apart lugs carried by said guard arranged in alinement with said first-named lugs, a vertical pivot carried by said lugs, the lower of said first-named lugs having a rounded surface, said guard having one edge contacting with one of said first-named lugs and its other edge disposed laterally thereof, and a contractile spring secured at one end to said guard and at its opposite end to said frame.

In testimony whereof I have affixed my signature in presence of two witnesses.

JOHN HENRY KUHNS.

Witnesses:
HARLEY A. GEBHART,
WM. LEROY KUHNS.

Copies of this patent may be obtained for five cents each, by addressing the "Commissioner of Patents, Washington, D. C."